3,328,407
1-(INDOLYL LOWER-ALKYL)-4-PHENYL-
PIPERAZINES
Sydney Archer, Bethlehem, N.Y., assignor to Sterling
Drug Inc., New York, N.Y., a corporation of Delaware
No Drawing. Filed Oct. 7, 1966, Ser. No. 584,985
11 Claims. (Cl. 260—268)

This invention relates to certain 1-[(3-indolyl)-lower-alkyl]-4-phenylpiperazines of the formula

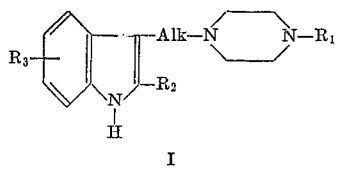

I where $R_1$ is unsubstituted-phenyl, carbo-lower-alkoxyphenyl, halophenyl, or lower-alkylphenyl; $R_2$ is hydrogen or lower-alkyl; $R_3$ is hydrogen, lower-alkanoyl, lower-alkanoylamino, amino, nitro, or lower-alkoxycarbonylamino, $R_3$ being lower-alkanoyl, lower-alkanoylamino, amino, nitro, or lower-alkoxycarbonylamino when $R_1$ unsubstituted-phenyl, halo-phenyl, or lower-alkyl-phenyl; and Alk is lower-alkylene.

As used herein, the terms lower-alkyl and loweralkylene mean lower-alkyl or lower-alkylene containing from one to seven carbon atoms which can be either straight or branched. Thus when $R_1$ is lower-alkylphenyl or when $R_2$ is lower-alkyl, said lower-alkyl groups can be methyl, ethyl, n-propyl, isopropyl, isobutyl, n-hexyl, and the like, and Alk, as lower-alkylene, can be methylene, 1,2-ethylene, 1,3-propylene, 2-methylbutylene, 2-ethylpentylene, 1,7-heptylene, and the like.

The compounds of Formula I can be prepared by a variety of several methods including the methods described in U.S. Patent 3,188,313, for example reduction of a 1-[(3-indolyl)-lower-alkanoyl]-4-phenylpiperazine having the formula:

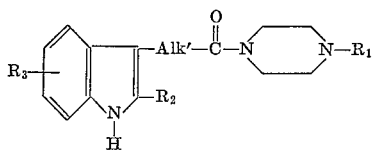

wherein $R_1$, $R_2$, and $R_3$ have the meanings given above and Alk' represents either a single bond or lower-alkylene containing from one to six carbon atoms. The reaction is preferably carried out at a temperature between 0° C. and 65° C. in an organic solvent inert under the conditions of the reaction, for example ether or tetrahydrofuran. It is preferred to use boron hydride or lithium aluminum hydride in refluxing tetrahydrofuran as the reducing agent.

Another procedure disclosed in U.S. Patent 3,188,313 and also useful in the preparation of the instant compounds is the Mannich reaction which requires the reaction of an indole with a 1-phenylpiperazine and formaldehyde according to the reaction:

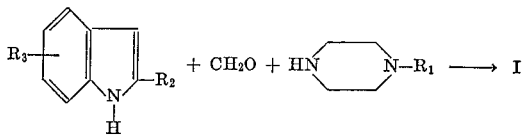

The reaction is useful in preparing compounds of Formula I in which Alk is methylene and is generally carried out at a temperature in the range from 50° C. to 150° C. and in an organic solvent inert under the conditions of the reaction, for example methanol, ethanol, isopropanol, and the like.

The present compounds can also be prepared by essentially a one-step reaction involving cyclization under acid conditions of an ω-[4-phenyl-1-piperazinyl]-lower-alkanaldehyde phenylhydrazone or ω-[4-phenyl-1-piperazinyl]-lower-alkyl lower-alkyl ketone phenylhydrazone of the formula:

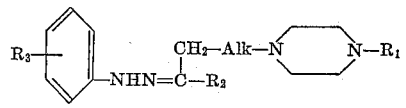

II where $R_1$, $R_2$, $R_3$, and Alk have the meanings given above. The reaction is carried out by heating the latter in the presence of an acid, for example, hydrochloric acid, sulfuric acid, p-toluenesulfonic acid, glacial acetic acid, and the like, and in an oragnic solvent inert under the conditions of the reaction, for example, methanol, ethanol, isopropanol, benzene, toluene, and the like. When glacial acetic acid is used as the acid condensing agent, it can also be used in excess as the solvent medium as well.

The hydrazones of Formula II in turn are prepared by reacting a phenylhydrazine of Formula III with an ω-(4-phenyl-1-piperazinyl)-lower-alkanaldehyde or an ω-(4-phenyl-1-piperazinyl)-lower-alkanone of Formula IV where $R_2$ is hydrogen or lower-alkyl, respectively. The reaction is represented by the equation:

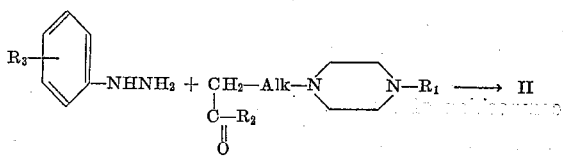

III           IV and generally takes place at room temperature. Like the cyclization of the hydrazones of Formula II to the products of Formula I, the reaction is advantageously carried out in an organic solvent inert under the conditions of the reaction, for example methanol, ethanol, isopropanol, benzene, toluene, xylene, and the like, and in the presence of an acid, for example, hydrochloric acid, sulfuric acid, p-toluenesulfonic acid, glacial acetic acid, and the like.

The hydrazones of Formula II thus formed can, if desired, be isolated from the reaction mixture before cyclizing to the indole final products. It is preferred to carry the reaction to completion, without isolating the intermediate hydrazones, by heating the reaction mixture containing the hydrazone which itself is formed at lower temperatures.

The compounds of Formula I where $R_3$ is amino are advantageously prepared by alkaline hydrolysis of the corresponding compounds where $R_3$ is lower-alkanoylamino. The reaction is preferably carried out by refluxing a solution of the lower-alkanoylamino compound in an alcoholic solution of an alkali metal hydroxide.

The compounds of Formula I where $R_3$ is lower-alkoxycarbonylamino are advantageously prepared by reacting, preferably at around 20° C., the corresponding amino compound ($R_3$ is $NH_2$) with a lower-alkyl haloformate in the presence of an acid-acceptor. The purpose of the acid-acceptor is to take up the hydrogen halide split out during the course of the reaction with which it forms water soluble salts which are readily separable from the reaction mixture. A preferred acid-acceptor is pyridine.

The novel compounds of the instant invention are the bases of Formula I and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configurations of the bases of the invention but is also representative of the structural entity which is common to all of the compounds, whether in the form of the free bases or in the form of the acid-addition salts of the bases. It has been found that by virtue of this common structural entity, the bases of Formula I and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, it is preferred of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, the salts of the compounds of Formula I are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaeutically-acceptable acid-addition salts by, for example, ion-exchange procedures.

It will be appreciated from the foregoing that all of the acid-addition salts of the new bases of Formula I are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new indoles, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, in which case the salt separates directly or can be obtained by concentration of the solution.

Pharmacological evaluation of the compounds of Formula I according to standard pharmacological test procedures has demonstrated that they possess adrenolytic, hypotensive, cardiac depressant, psychomotor depressant, anti-inflammatory, hexobarbital potentiation, anti-emetic, hypothermic, skeletal muscle relaxant, and anti-viral activities thus indicating their usefulness as adrenolytic, hypotensive, cardiovascular, tranquilizer, sedative, anti-emetic, hypothermic, skeletal muscle relaxant, anti-inflammatory, and anti-viral agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The chemical structures of the compounds of the invention are established by their mode of synthesis and are corroborated by infrared and ultraviolet spectra, and by the correspondence between calculated values for the elements and values found by chemical analysis.

The following examples will further illustrate specific embodiments of the invention without the latter being limited thereto.

EXAMPLE 1

*1-[2-(2-methyl-3 - indolyl)ethyl]-4-(4-carbethoxyphenyl) piperazine hydrochloride* [I: $R_1$ is 4—$C_6H_4CO_2C_2H_5$; $R_2$ is $CH_3$; $R_3$ is H; Alk is $CH_2CH_2$]

A mixture of 20 g. (0.056 mole) of 1-(3-acetylpropyl)-4-(4-carbethoxyphenyl)piperazine hydrochloride, 6 g. (0.056 mole) of phenylhydrazine, and 30 ml. of 7.1 N ethanolic hydrogen chloride in 300 ml. of absolute ethanol was heated under reflux for twenty-five hours, cooled, and the white precipitate which separated was collected, dried, and recrystallized twice from ethanol giving 12 g. of 1 - [2-(2-methyl-3-indolyl)ethyl]-4-(4-carbethoxyphenyl)piperazine, M.P. 239.5–241.0° C. (corr.).

EXAMPLE 2

Proceeding in a manner similar to that described in Example 1 above, the following compounds of Formula I were obtained:

(a) *1 - [2-(5-acetylamino-2-methyl-3-indolyl)ethyl]-4-phenylpiperazine* [I: $R_1$ is $C_6H_5$; $R_2$ is $CH_3$; $R_3$ is 5—$CH_3CONH$; Alk is $CH_2CH_2$] was prepared from 12 g. (0.044 mole) of 1-(3-acetylpropyl)-4-phenylpiperazine and 9 g. (0.044 mole) of 4-acetylaminophenylhydrazine in 60 ml. of acetic acid, isolated as the free base, and recrystallized from methanol-water, M.P. 207.0–210.0° C. (corr.);

(b) *1 - [2-(5-acetylamino-2-methyl-3-indolyl)ethyl]-4-(4-chlorophenyl)piperazine* [I: $R_1$ is 4—$ClC_6H_4$; $R_2$ is $CH_3$; $R_3$ is 5—$CH_3CONH$; Alk is $CH_2CH_2$] was prepared from 5 g. (0.025 mole) of 1-(3-acetylpropyl)-4-(4-chlorophenyl)piperazine and 9 g. (0.025 mole) of 4-acetylaminophenylhydrazine in 60 g. of glacial acetic acid, isolated as the free base, and recrystallized from ethanol-water-ethyl acetate, M.P. 101.0–103.0° C. (corr.);

(c) *1 - [2-(2-methyl-3-indolyl)ethyl]-4-(2,4,6-trimethylphenyl)-piperazine* [I: $R_1$ is 2,4,6—$(CH_3)_3C_6H_2$; $R_2$ is $CH_3$; $R_3$ is H; Alk is $CH_2CH_2$] was prepared from 32.5 g. (0.1 mole) of 1-(3-acetylpropyl)-4-(2,4,6-trimethylphenyl)piperazine hydrochloride, 11 g. (0.1 mole) of phenylhydrazine, and 100 ml. of 4.9 N ethanolic hydrogen chloride in 400 ml. of ethanol, isolated as the free base, and recrystallized from methanol, M.P. 134.2–135.6° C. (corr.);

(d) 1 - [2-(5-acetylamino-2-methyl-3-indolyl)ethyl]-4-(3-chlorophenyl)piperazine [I: $R_1$ is 3—$ClC_6H_4$; $R_2$ is $CH_3$; $R_3$ is 5—$CH_3CONH$; Alk is $CH_2CH_2$] was prepared from 16 g. (0.050 mole) of 1-(3-acetylpropyl)-4-(3- chlorophenyl)piperazine and 10 g. (0.05 mole) of 4-acetylaminophenylhydrazine in 120 g. of glacial acetic acid, isolated as the free base, and recrystallized from isopropanol-isopropyl acetate, M.P. 179.8–181.0° C. (corr.); and (e) 1-[2-(methyl - 3 - indolyl)ethyl]-4-(5-chloro-2,4-dimethoxyphenyl)piperazine [I: $R_1$ is

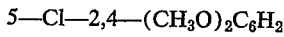

$R_2$ is $CH_3$; $R_3$ is H; Alk is $CH_2CH_2$] was prepared from 20 g. (0.053 mole) of 1-(3-acetylpropyl)-4-(5-chloro-2,4-dimethoxyphenyl)piperazine, 5.8 g. (0.053 mole) of phenylhydrazine, and 75 ml. of 4.9 N ethanolic hydrogen chloride in 200 ml. of absolute ethanol, isolated as the free base, and recrystallized from methanol, M.P. 155.6–156.8° C. (corr.).

EXAMPLE 3

1 - [2-(5-amino-2-methyl-3-indolyl)ethyl]-4-phenylpiperazine [I: $R_1$ is $C_6H_5$; $R_2$ is $CH_3$; $R_3$ is 5—$NH_2$; Alk is $CH_2CH_2$]

A suspension of 16 g. (0.043 mole) of 1-[2-(5-acetylamino - 2 - methyl-3-indolyl)ethyl]-4-phenylpiperazine in 500 ml. of 10% ethanolic potassium hydroxide was stirred and heated under reflux for eighteen hours during which time all solid material dissolved. The reaction mixture was then poured into two liters of ice water, extracted with three liters of ether, and the ether extracts were dried, charcoaled, and concentrated to about 300 ml. The light tan solid which separated from the concentrated solution was collected and recrystallized twice from ether giving 4 g. of 1-[2-(5-amino-2-methyl-3-indolyl)-ethyl]-4-phenylpiperazine, M.P. 152.4–154.0° C. (corr.).

EXAMPLE 4

1 - [2-(5-ethoxycarbonylamino-2-methyl-3-indolyl)ethyl]-4-phenylpiperazine p-toluenesulfonate [I: $R_1$ is $C_6H_5$; $R_2$ is $CH_3$; $R_3$ is 5—$C_2H_5OCONH$; Alk is $CH_2CH_2$]

A solution of 10 g. (0.03 mole) of 1-[2-(5-amino-2-methyl-3-indolyl)ethyl]-4-phenylpiperazine in 200 ml. of pyridine was treated with 11 g. (0.1 mole) of ethyl chloroformate, then cooled to room temperature and treated with 100 ml. of 10% aqueous sodium carbonate. The mixture was poured into two liters of ice water, and the oil which separated crystallized on standing and was collected, dried, and converted to the p-toluenesulfonate salt, M.P. 199.0–201.0° C. (corr.).

EXAMPLE 5

1-[(5-acetyl-3-indolyl)methyl]-4-phenylpiperazine [I: $R_1$ is $C_6H_5$; $R_2$ is H; $R_3$ is 5—$CH_3CO$; Alk is $CH_2$]

A mixture of 20 g. (0.125 mole) of 5-acetylindole, 24 g. (0.15 mole) of 1-phenylpiperazine, 10 g. (0.125 mole) of 37% formaldehyde, 100 ml. of glacial acetic acid, and 400 ml. ethanol was heated under reflux for five hours, cooled to room temperature, concentrated in vacuo to about 150 ml., and poured into 2.5 liters of ice water. The mixture was extracted with ether, and the aqueous raffinate was rendered basic with 35% sodium hydroxide. The solid which separated was collected, dried, recrystallized from methanol-water, and chromatographed on silica gel, the product being eluted with methanol. There was thus obtained 10 g. of 1-[(5-acetyl-3-indolyl) methyl] - 4 - phenylpiperazine, M.P. 169.0–174.2° C. (corr.).

EXAMPLE 6

1-[2-(5-nitro-2-methyl - 3 - indolyl)ethyl]-4-phenylpiperazine hydrochloride [I: $R_1$ is $C_6H_5$; $R_2$ is $CH_3$; $R_3$ is 5—$NO_2$; Alk is $CH_2CH_2$]

To a stirred mixture of 28 g. (0.17 mole) of 1-phenylpiperazine, 17 g. (0.17 mole) of triethylamine, and 400 ml. of dry pyridine was added 7.8 g. (0.057 mole) of phosphorus trichloride. After stirring for about thirty minutes, the mixture was treated with a solution of 20 g. (0.086 mole) of (5-nitro-2-methyl-3-indolyl)acetic acid in 100 ml. of pyridine and heated on a steam bath for one hour. The mixture was then taken to dryness in vacuo, the residual mass was dissolved in 2 liters of warm ethyl acetate, the solution washed first with saturated sodium bicarbonate solution, then with saturated sodium chloride solution, dried over sodium sulfate, and concentrated to 200 ml. The solid which separated from the cooled solution was collected and dried giving 20 g. of 1-[(5-nitro-2-methyl - 3 - indolyl)acetyl]-4-phenylpiperazine, M.P. 192–194° C. (uncorr.).

The latter (20 g., 0.053 mole), dissolved in 700 ml. of tetrahydrofuran, was added to a solution of 200 ml. of 1.0 molar boron hydride in tetrahydrofuran. The deep red solution was refluxed for two hours, and then treated dropwise, with cooling, with 10 ml. of water, followed by 50 ml. of concentrated hydrochloric acid. The mixture was again heated to reflux for thirty minutes, neutralized carefully with 10% aqueous sodium hydroxide, and then stirred with 500 ml. of 25% aqueous sodium carbonate. The layers were separated, and the organic layer was dried and evaporated in vacuo. The residue was taken into ethyl acetate and chromatographed on 400 g. of silica gel. The purified fractions thus obtained were combined, converted to the hydrochloride salt, and the latter recrystallized from ethanol giving 5.0 g. of 1-[2-(5-nitro-2-methyl-3-indolyl)ethyl]-4-phenylpiperazine hydrochloride, M.P. 269.0–270.0° C. (corr.).

I claim:

1. A compound having the formula

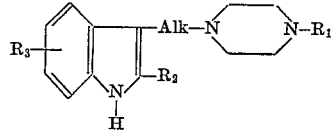

wherein $R_1$ is unsubstituted-phenyl, carbo-lower-alkoxyphenyl, halophenyl, or lower-alkyl-phenyl; $R_2$ is hydrogen or lower-alkyl; $R_3$ is hydrogen, lower-alkanoyl, lower-alkanoylamino, amino, nitro, or lower-alkoxycarbonylamino, $R_3$ being lower-alkanoyl, lower-alkanoylamino, amino, nitro, or lower-alkoxycarbonylamino when $R_1$ is unsubstituted-phenyl, halo-phenyl, or lower-alkylphenyl; and Alk is lower-alkylene containing from one to seven carbon atoms.

2. 1-[2-(2-methyl - 3 - indolyl)ethyl]-4-(4-carbethoxyphenyl)piperazine according to claim 1 wherein $R_1$ is 4-carbethoxyphenyl; $R_2$ is methyl; $R_3$ is hydrogen; and Alk is 1,2-ethylene.

3. 1-[2-(5-acetylamino - 2 - methyl-3-indolyl)ethyl]-4-phenylpiperazine according to claim 1 wherein $R_1$ is unsubstituted-phenyl; $R_2$ is methyl; $R_3$ is 5-acetylamino; and Alk is 1,2-ethylene.

4. 1-[2-(5-acetylamino - 2 - methyl-3-indolyl)ethyl]-4-(4-chlorophenyl)piperazine according to claim 1 wherein $R_1$ is 4-chlorophenyl; $R_2$ is methyl; $R_3$ is 5-acetylamino; and Alk is 1,2-ethylene.

5. 1-[2-(5-acetylamino - 2 - methyl-3-indolyl)ethyl]-4-(3-chlorophenyl)piperazine according to claim 1 wherein $R_1$ is 3-chlorophenyl; $R_2$ is methyl; $R_3$ is 5-acetylamino; and Alk is 1,2-ethylene.

6. 1 - [2-(2-methyl-3-indolyl)ethyl]-4-(2,4,6-trimethylphenyl)piperazine according to claim 1 wherein $R_1$ is 2,4,6-trimethylphenyl; $R_2$ is methyl; $R_3$ is hydrogen; and Alk is 1,2-ethylene.

7. 1 - [2-(2-methyl-3-indolyl)ethyl]-4-(2,4-dimethoxy-5-chlorophenyl)piperazine according to claim 1 wherein $R_1$ is 2,4-dimethoxy-5-chlorophenyl; $R_2$ is $CH_3$; $R_3$ is hydrogen; and Alk is 1,2-ethylene.

8. 1 - [2-(2-methyl-5-amino-3-indolyl)ethyl]-4-phenylpiperazine according to claim 1 wherein $R_1$ is unsubstituted-phenyl; $R_2$ is methyl; $R_3$ is 5-amino; and Alk is 1,2-ethylene.

9. 1 - [2-(2-methyl-5-ethoxycarbonylamino-3-indolyl)-ethyl]-4-phenylpiperazine according to claim 1 wherein $R_1$ is unsubstituted-phenyl; $R_2$ is methyl; $R_3$ is 5-ethoxycarbonylamino; and Alk is 1,2-ethylene.

10. 1 - [(5-acetyl-3-indolyl)methyl]-4-phenylpiperazine according to claim 1 wherein $R_1$ is unsubstituted-phenyl; $R_2$ is hydrogen; $R_3$ is 5-acetyl; and Alk is methylene.

11. 1 - [2-(2-methyl-5-nitro-3-indolyl)ethyl]-4-phenylpiperazine according to claim 1 wherein $R_1$ is unsubstituted-phenyl; $R_2$ is methyl; $R_3$ is 5-nitro; and Alk is 1,2-ethylene.

References Cited

UNITED STATES PATENTS 3,135,794   6/1964   Archer _____ 260—562

ALEX MAZEL, *Primary Examiner.*

HENRY R. JILES, *Assistant Examiner.*